United States Patent
Belanger et al.

[11] Patent Number: 5,850,958
[45] Date of Patent: Dec. 22, 1998

[54] CUSHIONING BABY CHAIR BASE FOR BICYCLES

[76] Inventors: Alain Belanger, 4335, Rue Brebeuf #4, Montrêal, Canada, H2J3K6; Hugo Marsolais, 362 Rue Lulli, Laval-Des-Rapides, Laval, Canada, H7N5N7

[21] Appl. No.: 783,208

[22] Filed: Jan. 14, 1997

[51] Int. Cl.$^6$ ........................................................ B62J 1/02
[52] U.S. Cl. ........................... 224/415; 224/427; 224/453
[58] Field of Search ...................... 224/415, 425, 224/427, 431, 444, 453; 280/202, 288.4; 297/196, 250.1, 256.16

[56] References Cited

U.S. PATENT DOCUMENTS

| | | | |
|---|---|---|---|
| 556,951 | 3/1896 | Williams et al. | 224/415 X |
| 1,090,477 | 3/1914 | Hedstrom | 224/415 X |
| 5,382,038 | 1/1995 | Allsop et al. | 297/196 X |
| 5,529,325 | 6/1996 | Glog, et al. | 224/427 X |

*Primary Examiner*—Renee S. Luebke

[57] ABSTRACT

The present invention relates to adaptors for mounting a baby chair on a bicycle. The adaptor includes an elongated supporting structure provided with a bending channel fitted with a cushioning element to reduce the shocks and the vibrations usually transmitted from the bicycle to the child seated in the baby chair so that the child may comfortably and safely be transported on a conventional bicycle. The elongated supporting structure includes a first end to be mounted to the bicycle and a second end provided with a fixing plate, on which a baby chair is installed. Different accessories, for example, luggage racks, reflectors and flags may also be added to the adaptor.

19 Claims, 7 Drawing Sheets

CUSHIONING BABY CHAIR BASE FOR BICYCLES

BACKGROUND OF THE INVENTION

The present invention relates to baby chair, and more particularly to a cushioning baby chair base for bicycles.

Typical baby chairs for wheeled cycles, such as bicycles, are directly disposed on the rack of the wheeled cycles without any cushioning means such that the vibrations and shocks transmitted to the cycles are also transmitted to the children seated on the baby chairs. Thus, the children, particularly the back and the brain portion of the children, are hurt by the shocks and vibrations. Some models of baby chair provide a thin cushion to place between the child and said baby chair but the cushioning property of that kind of item is simply not sufficient. The problem is that the racks which support the baby chairs are rigid.

The U.S. Pat. No. 5,370,441 describes a baby chair for wheeled cycles which includes means for cushioning purposes such that the child seated on the baby chair may feel comfortable and will not be hurt by the shocks and vibrations. The baby chair is installed on a board fixed to a carrier which is fixed to a bicycle frame. The front portion of the baby chair is secured to the front portion of the board thanks to an arm which is used as a pivot and which allows the baby chair to rotate around said pivot in the direction of the driver of the bicycle. Two spiral springs are located between the rear portion of the board and the lower back portion of the baby chair. In accordance with the owner of this invention, said springs procure good cushioning results.

However, the U.S. Pat. No. 5,370,441 includes some major disadvantages. First, the results obtained by the means for cushioning purposes cannot be satisfactory. Indeed, to correctly isolate the child seated on the baby chair from the shocks and vibrations which comes from the irregularities of the road, the cushioning device has to work by the principle of a combination of mechanical components which consists in at least a spring and a shock absorber. The spring allows the baby chair to execute some movements compared to the road while the shock absorber minimizes the amplitude of said movements and tends to bring the system back to its initial equilibrium position. One of the most popular example of that kind of combination of mechanical components used to procure good cushioning purposes is the car industry suspensions. Furthermore, because of the proximity of the pivot and the baby chair, the movements described by said baby chair are radial. So, with the invention U.S. Pat. No. 5,370,441, the child seated on the baby chair has good chances to feel sick because of the radial and not lessened movements described by said chair during a ride.

The primary objective of the present invention is to provide a cushioning baby chair base for bicycles which reduces considerably the shocks and vibrations produced by the movement of a bicycle on the irregularities of a road and which are usually transmitted to the child seated on the baby chair. Comparatively to the invention U.S. Pat. No. 5,370,441, our invention, which requires less pieces, includes a combination of mechanical components which consists in a spring and a shock absorber hereinafter called the cushioning device. The spring consists in a stabilizing device which has a reversed U-shape in which a piece of rubber or elastomer, which procures the effect of a shock absorber, is inserted. Considering the distance between the baby chair and the fixing point of the cushioning baby chair base for bicycles which is either the seat post of the bicycle or its frame, the movement of the baby chair during a ride looks more like a linear and vertical one then a radial one. Furthermore, the cushioning effect produces at the baby chair and the frequency of the swayings can be adjusted in relation with the weight of the child thanks to a sliding arm which can be inserted more or less into a main arm allowing to adjust the distance between the cushioning device and the baby chair.

It is also possible to transform the cushioning baby chair base for bicycles into a carrier. To do so, the sliding arm, on which the baby chair is installed, has to be removed from the main arm in order to install on said main arm a carrier similar to those which are presently available on the market. The carrier can also be installed on the fixing plate when the baby chair is removed. The main arm can also include some security accessories like a flag, reflectors and so on.

BRIEF SUMMARY OF THE INVENTION

The invention herein disclosed consists in a cushioning baby chair base for bicycles which works by the principle of a combination of mechanical components which consists in a spring and a shock absorber called the cushioning device. Said invention includes a fixing plate, on which a baby chair is installed, which is fixed to the extremity of a sliding arm which is inserted partially in a main arm overhung to a seat post or to a bicycle frame through a cushioning and a fixing device. The set formed by the sliding arm and the main arm is hereinafter called the supporting telescopic arm. Said invention reduces considerably the shocks and vibrations produced by the movement of a bicycle on the irregularities of a road and which are usually transmitted to the child seated on the baby chair.

The cushioning device is composed of a compressible and a stabilizing device. The stabilizing device acts as a spring which has a reversed U-shape in which a compressible device, which procures the effect of a shock absorber, is inserted. Said stabilizing device controls the putting out of shape of the compressible device in order to minimize the lateral movements of the baby chair. In its simplest version, said stabilizing device is made of a bent thin steel plate or of any other material which has good elasticity and stiffness properties. The stabilizing device envelops partially the compressible device. In a more sophisticated version, the stabilizing device includes at least one articulation which works on the principle of a door hinge.

The cushioning device is located between the main arm and the fixing device. The configuration of said cushioning device is such that it is slightly put out of shape (downwardly) when an impact occurs allowing the baby chair to swing around its initial position through the supporting telescopic arm. The compressible device is made of rubber or an elastomer material or any combination of said materials. In addition to its shock absorber properties, it can also possess some spring properties. In order to improved its shock absorber properties, the compressible device can be equipped with a valve which has a fixed or a variable opening which is connected to an internal air bag located into said compressible device. With the valve which comes with a variable opening, the air flow restriction is controlled by an air output device. This feature allows a certain air flow to get out of the internal air bag, in accordance with a given restriction, when the baby chair moves down and to get in when the baby chair moves up. The principal advantage of the valve equipped with a variable opening is that the user can adjust the cushioning effects of its own cushioning baby chair base in accordance with his own preferences.

The supporting telescopic arm is composed of a main arm, fixed to the cushioning device, and a sliding arm to which the fixing plate is fixed. The sliding arm can be inserted more or less into the main arm allowing to adjust the distance between the cushioning device and the baby chair. This characteristic of the supporting telescopic arm procures to the cushioning device the possibility to keep optimal cushioning properties independently of the weight of the child seated on the baby chair. Indeed, with the adjustment of the length of the supporting telescopic arm, which is facilitated thanks to positioning marks which correspond to the weight of the child, it is possible to subject the cushioning device to an optimal momentum. This characteristic of the supporting telescopic arm procures a cushioning baby chair base for bicycles which is filly adaptable and safe.

An angular adjusting device can be used to modify the inclination of the base of the baby chair in order to be parallel to the road independently of the model of bicycle used. An auxiliary cushioning device which is equipped at each of its extremity with a fastener, which comes with a pivot, can also be used as a complement to the cushioning device. Said auxiliary cushioning device is installed between the fixing plate and the bicycle frame.

If the cushioning baby chair base for bicycles is secured to the seat post of a bicycle, said seat post have to be stronger then those which are presently available on the market. The cushioning baby chair base for bicycles could be sold with a stronger seat post which possesses a thicker wall, an additional metallic sleeve or which is made of a stronger material. This solidification is necessary to procure to the seat post the strength required to resist to the stresses induce by the weight of the child that is overhung to it. A model of cushioning baby chair base for bicycles which comes with an incorporated seat post could also be manufactured.

Different accessories like a carrier, reflectors, a flag and so on can be installed on the main arm and/or on the fixing plate.

DETAILED DESCRIPTION OF THE INVENTION

Figure 1:
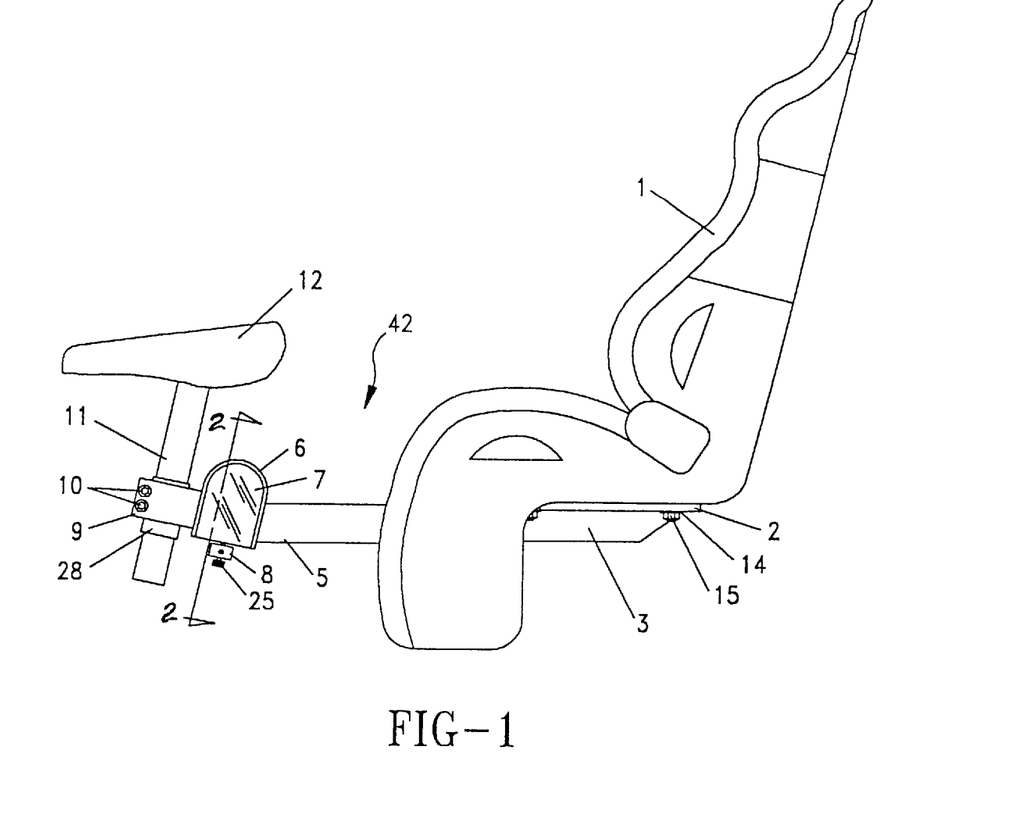
FIG. 1 is a side elevational view of a cushioning baby chair base for bicycles on which a baby chair is installed.
Figure 3:
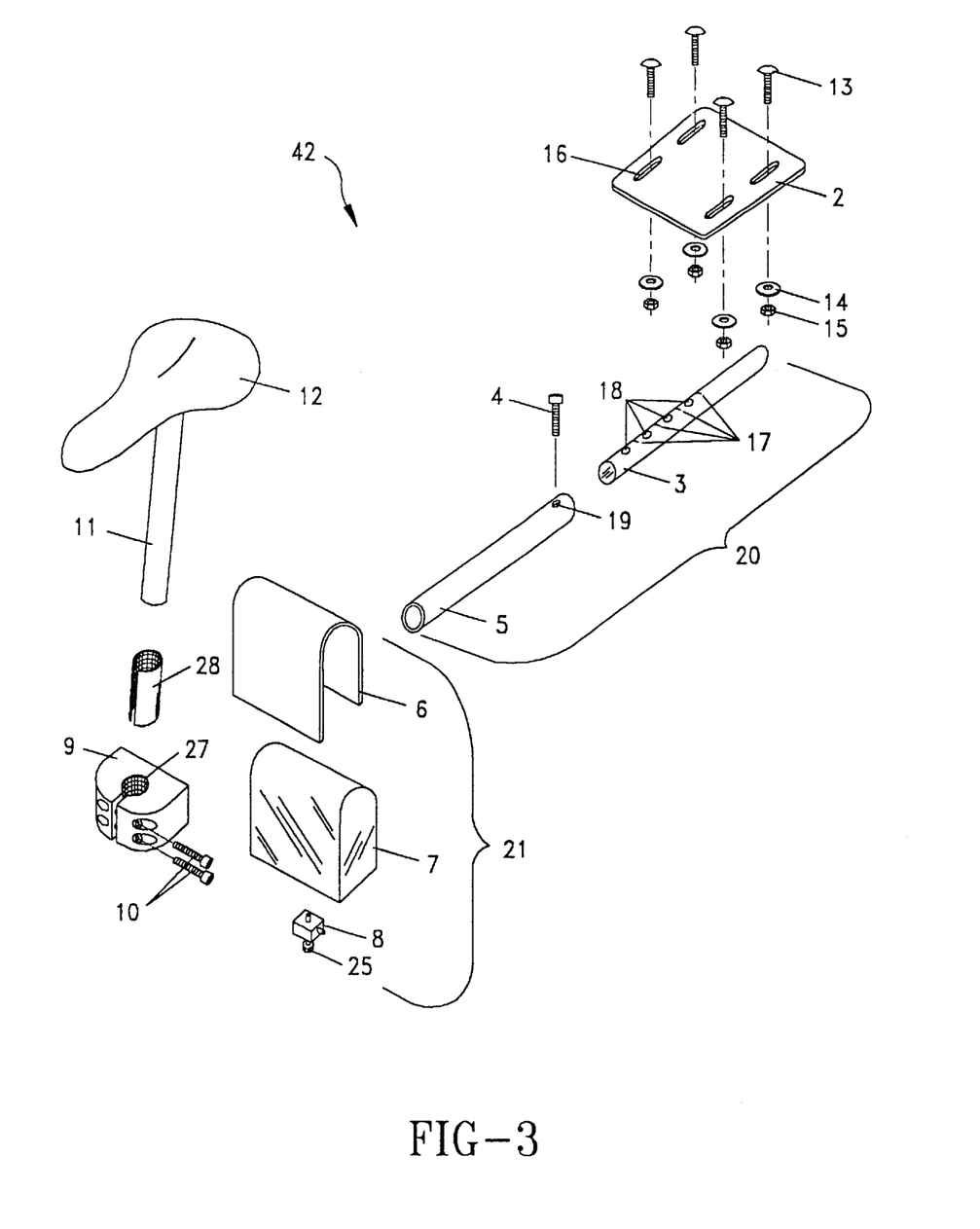
FIG. 3 is an exploded perspective view which shows various components parts of a cushioning baby chair base for bicycles.

Referring to FIGS. 1 and 3, there is shown, in a side elevational and in an exploded perspective view respectively, a cushioning baby chair base for bicycles 42 in accordance with an embodiment of the present invention. Said cushioning baby chair base for bicycles 42 is principally composed of a fixing plate 2, a supporting telescopic arm 20 (which is composed of a sliding arm 3 and a main arm 5), a cushioning device 21 (which is composed of a stabilizing device 6 and a compressible device 7) and a fixing device 9 equipped with an opening 27 which has a milled and/or antiskid internal surface.

There is also shown a conventional baby chair, hereinafter called baby chair 1, which is secured to the fixing plate 2 with the help of screws 13, washers 14 and nuts 15. The fixing plate 2, which includes openings 16, is welded to the sliding arm 3. The sliding arm 3 can be inserted more or less into the main arm 5 and kept in place thanks to a hole 19 and a retaining screw 4. The sliding arm 3 includes positioning marks 17 and positioning holes 18 which allow to easily adjust the distance between the baby chair 1 and the cushioning device 21 in relation with the weight of the child. The main arm 5 is welded to the stabilizing device 6. The compressible device 7 is inserted into the stabilizing device 6 and is stuck there thanks to an industrial adhesive.

Figure 2:
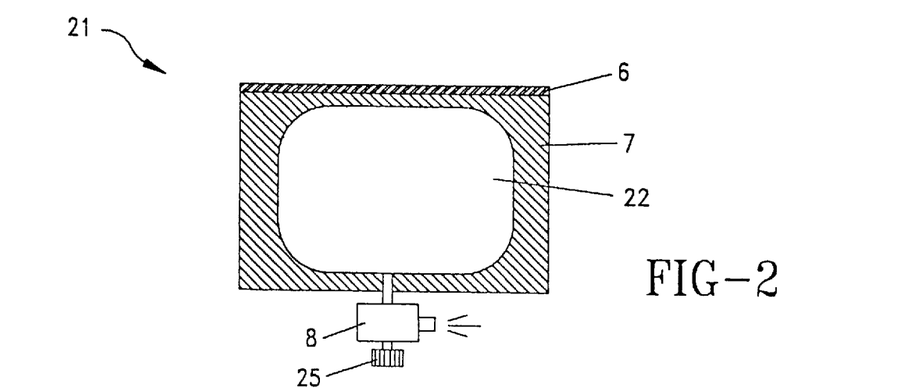
FIG. 2 is a sectional view taken along the lines A—A of FIG. 1 which shows various components parts of a cushioning device.

Referring to FIG. 2, there is shown, in a sectional view taken along the lines A—A of FIG. 1, the compressible device 7 part of the cushioning device 21. The compressible device 7 can be full or partly hollow and equipped with an internal air bag 22. In that case, a valve 8, which can be equipped either with fixed or a variable opening, is located between the internal air bag 22 and the outside. In the case of the variable opening, the restriction of the air flow which passes through the valve 8 can be controlled by an air output device 25.

Figure 4:
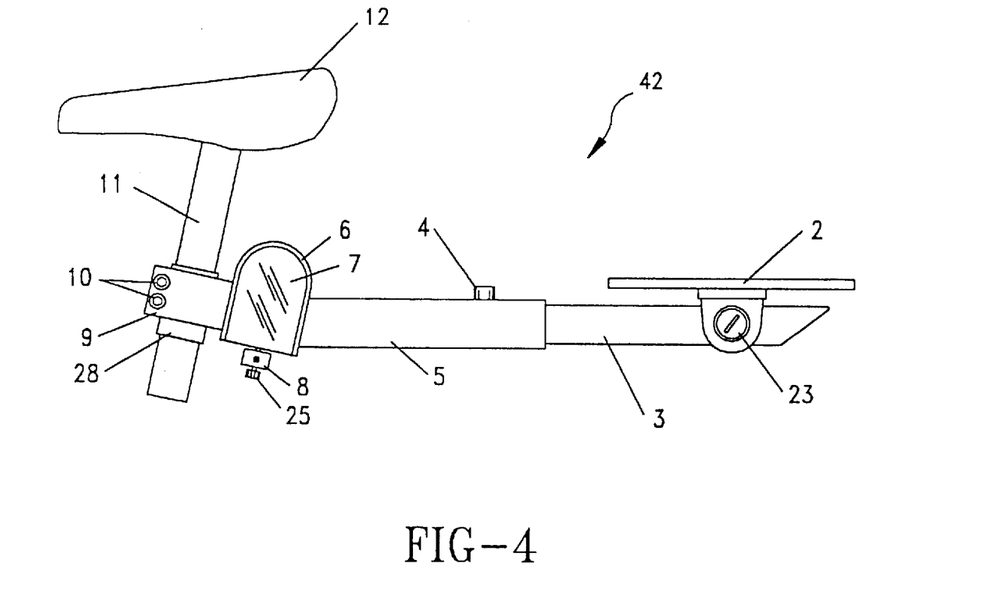
FIG. 4 and FIG. 5 are side elevational views of two cushioning baby chair bases for bicycles both equipped with an angular adjusting device.
Figure 5:
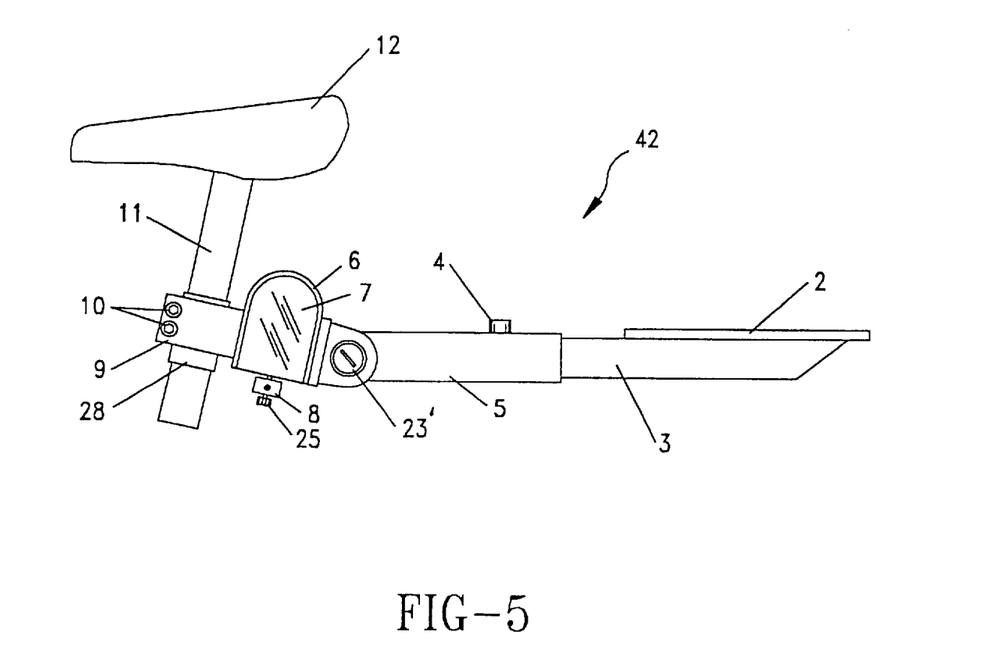

The fixing device 9, which is welded to the stabilizing device 6, is secured to a seat post 11, on which a seat 12 is installed, thanks to tightening screws 1O. Any other similar fixing device, which works on the principle of a jaw which grips a structural component, can be used to fix the cushioning baby chair base for bicycles 42 to any part of the bicycle frame 41. A metallic slotted sleeve 28, which is a little longer then the height of the fixing device 9, can also be placed between the seat post 11 and the opening 27 in order to distribute on a larger surface the stresses induce into said seat post by the weight of the child that is overhung (FIG. 3). The slot of the metallic slotted sleeve 28, which stretches all over its length, procures to said sleeve the possibility to fit different sizes of seat posts which are presently available on the market. Said metallic slotted sleeve 28 possesses milled and/or antiskid internal and external surfaces. Referring to FIGS. 4 and 5, there is shown, in side elevational views, an angular adjusting device 23 and 23' which can be used to modify the inclination of the base of the baby chair 1 in order to be parallel to the road independently of the model of bicycle used.

Figure 6:
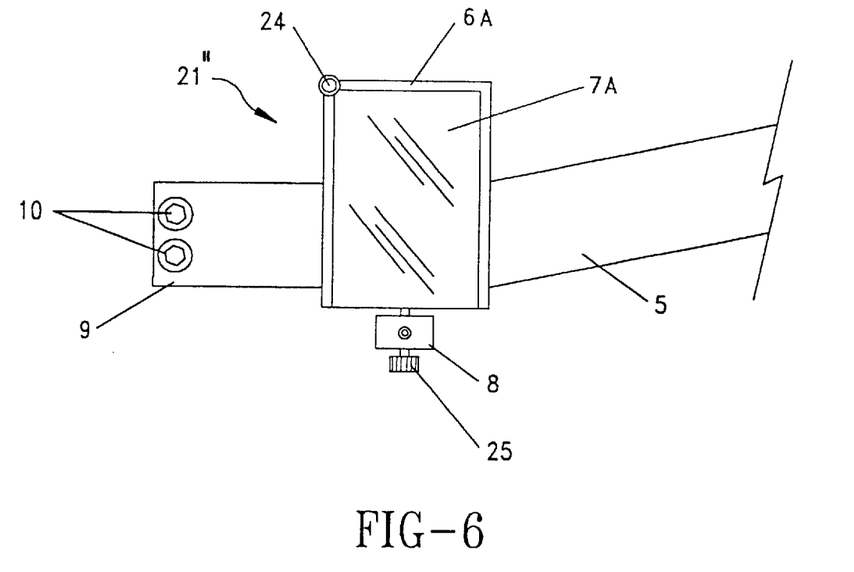
FIG. 6 and FIG. 7 are side elevational views which show examples of configurations of a cushioning device which comes with an articulation.
Figure 7:
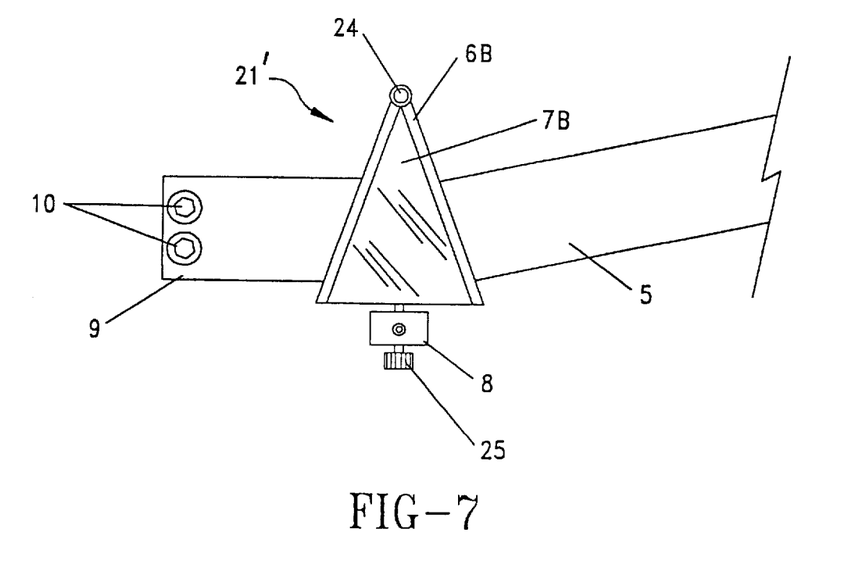

Referring to FIGS. 6 and 7, there is shown, in side elevational views, two alternative versions of the compressible device 7 which are the compressible devices 7A and 7B. The stabilizing device 6 also has its alternative versions which are the stabilizing devices 6A and 6B. Those alternative versions of the cushioning device 21" and 21' include at least one articulation 24 which works on the principle of a conventional door hinge.

Figure 8:
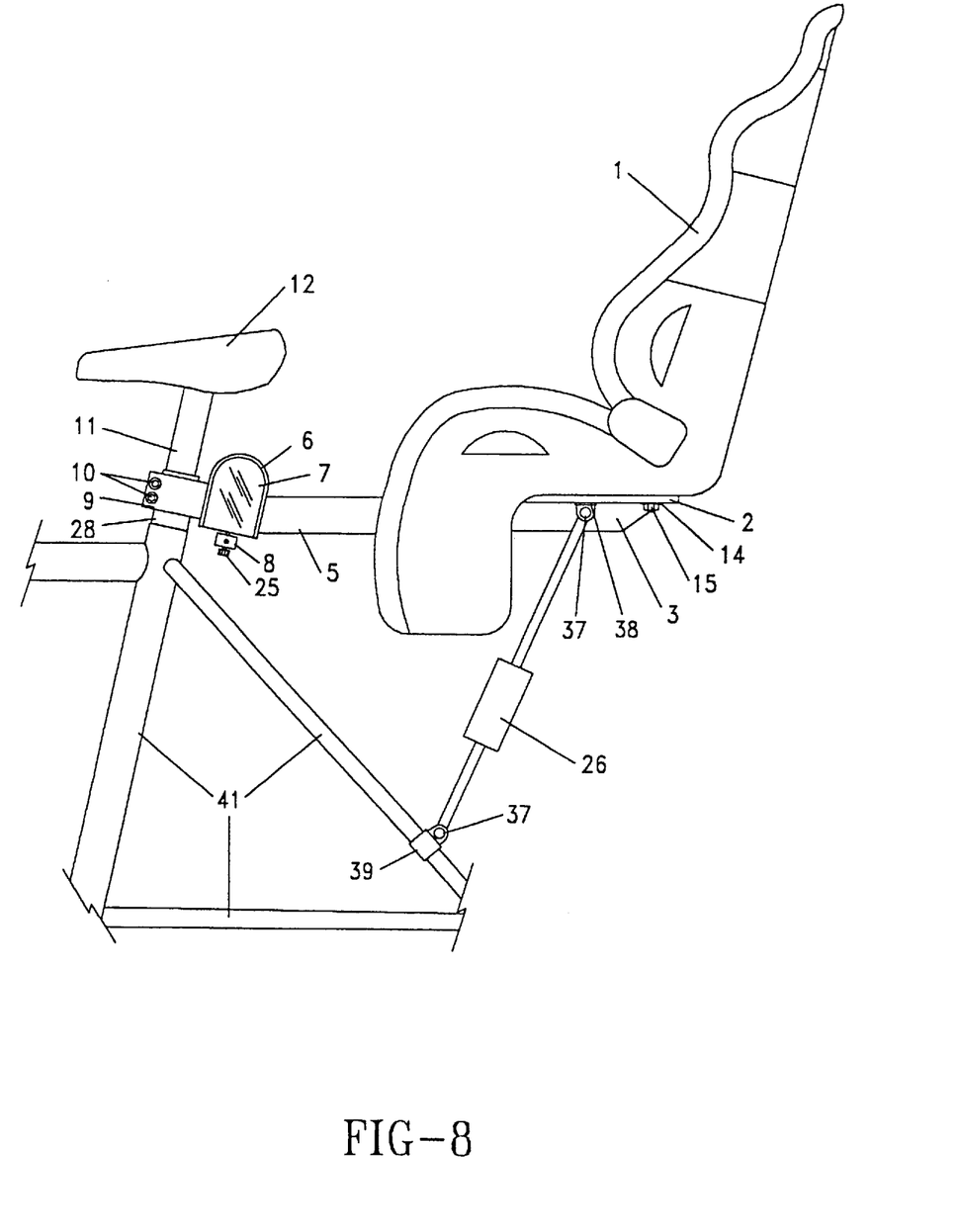
FIG. 8 is a side elevational view of a cushioning baby chair base for bicycles on which a baby chair and an auxiliary cushioning device are installed.

Referring to FIG. 8, there is shown, in a side elevational view, an auxiliary cushioning device 26 which is equipped with fasteners 38 and 39 which both come with a pivot 37. Said auxiliary cushioning device 26, which works by the principle of energy dispersion by friction, can be used as a complement to the cushioning device 21. The auxiliary cushioning device 26 is installed between the bicycle frame 41 and the fixing plate 2.

Referring to FIGS. 1 to 8, in a preferred method of manufacturing, the fixing plate 2 and the sliding arm 3 are made of aluminum. The main arm 5, the stabilizing devices 6, 6A, 6B, the fixing device 9, and the articulation 24 are made of metal like steel or aluminum. The compressible devices 7, 7A and 7B are made of rubber or any elastomer material or any combination of said materials which possess the properties of a shock absorber (they can also have some spring properties).

Figures 9, 10:
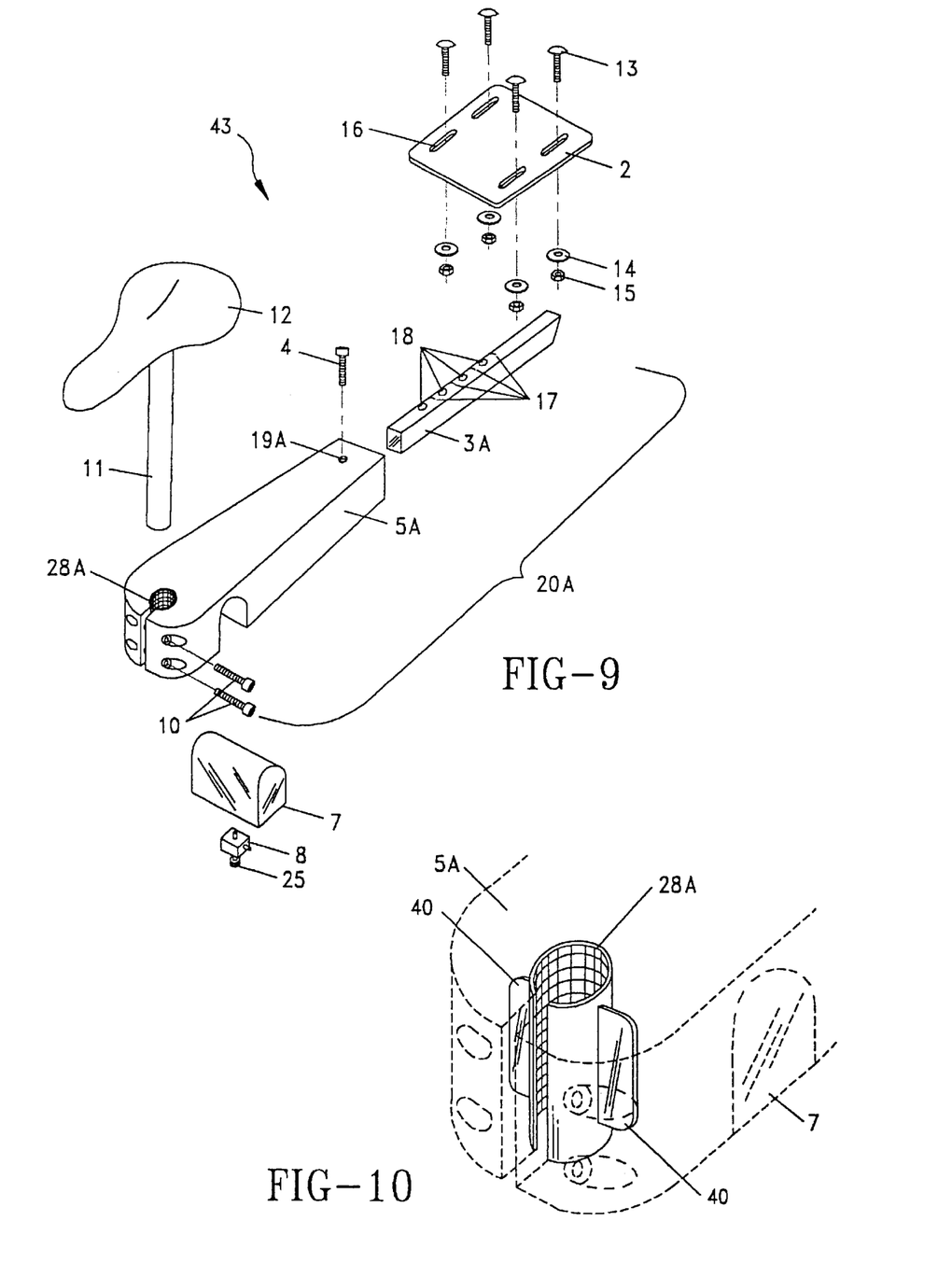
FIG. 9 is an exploded perspective view which shows various components parts of an alternative version of a cushioning baby chair base for bicycles.
FIG. 10 is a perspective view of a slotted sleeve part of an alternative version of a cushioning baby chair base for bicycles.

Referring to FIG. 9, there is shown, in an exploded perspective view, an alternative version of a cushioning baby chair base for bicycle 43 which works on the same principle then the one presented before. There is still a fixing plate 2, which includes openings 16, on which a baby chair 1 can be fixed thanks to screws 13, washers 14 and nuts 15. The fixing plate 2 is welded to the sliding arm 3A. The sliding arm 3A is part of a supporting telescopic arm 20A which includes a main arm 5A obtained by a plastic injection process. The sliding arm 3A, which includes positioning marks 17 and positioning holes 18, is secured into the main arm 5A thanks to a hole 19A, which passes through the main arm 5A, and a retaining screw 4. The main arm 5A includes a fixing device which is used to secure the cushioning baby chair base for bicycle 43 to the seat post 11 with the help of tightening screws 10. This alternative version of the main arm 5A procures a cushioning effect similar to the one obtained with the first version hereinabove mentioned which includes a main arm 5, a stabilizing device 6 and a distinct fixing device 9.

Because the main arm 5A is made of plastic, washers 44 and nuts 45 have to be inserted into it where the tightening screws 10 and the retaining screw 4 are used in order to procure them a good grip. Referring to FIG. 13, there is shown, in a sectional view taken along lines B—B of FIG. 12, a typical layout of two washers 44 and a nut 45 used to procure a good grip to a screw. Furthermore, a metallic slotted sleeve 28A (FIG. 10) has to be added to the fixing device in order to distribute on a larger surface the stresses induce into the seat post 11 and the main arm 5A by the weight of the child seated on the baby chair. The metallic slotted sleeve 28A has a milled and/or antiskid internal surface and is equipped with fins 40 in order to be properly secured into the main arm 5A. The washers 44, the nuts 45 and the metallic slotted sleeve 28A are inserted into the mold of the main arm 5A before the plastic is injected. Thus, when the plastic is injected and then cools down, said pieces are secured into the main arm 5A.

Figure 11:
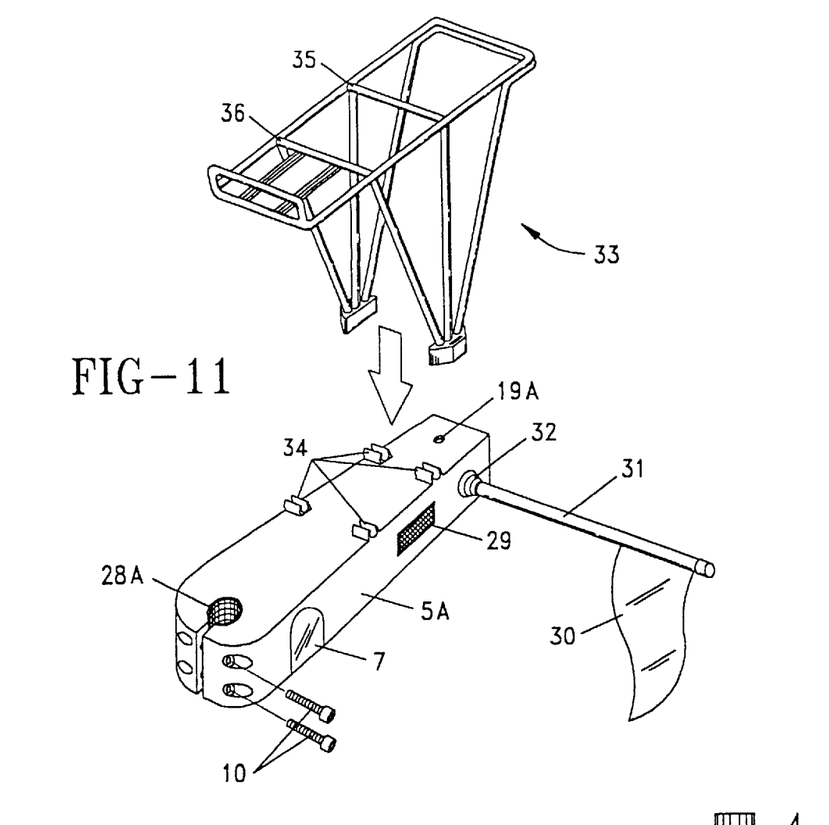
FIG. 11 is an exploded perspective view of an alternative version of a cushioning baby chair base for bicycles on which different accessories can be installed.

Referring to FIG. 11, there is shown, in an exploded perspective view, an alternative version of the cushioning baby chair base for bicycles 43 which facilitate the installation of different accessories like reflectors 29 (built-in or not), a flag 30, a rack 33 which can be used as a carrier, and so on. The reflectors 29 are located on both sides of the main arm 5A. A flexible fastener 32, to which the extremity of the stem 31 of the flag 30 is linked, is built-in the main arm 5A. The rack 33 can be easily installed to the main arm 5A thanks to anchorage devices 34 in which a rod 35 and a rod 36, parts of said rack 33, can be inserted.

Figure 12:
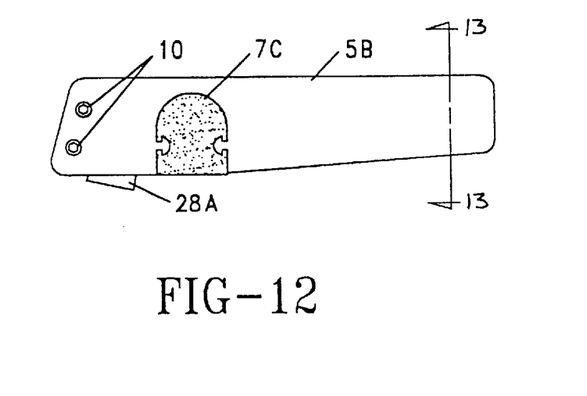
FIG. 12 is a side elevational view of an alternative version of a main arm part of an alternative version of a cushioning baby chair base for bicycles.
Figure 13:
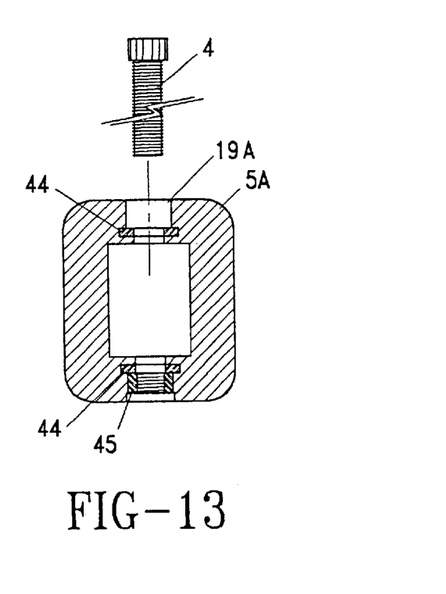
FIG. 13 is a sectional view taken along lines B—B of FIG. 12 which shows typical metallic components inserted into a main arm part of an alternative version of a cushioning baby chair base for bicycles.

Referring to FIG. 12, there is shown, in side elevational view, an alternative version of the compressible device 7 and the main arm 5A of FIG. 9. Indeed, there is shown a compressible device 7C and a main arm 5B which both have a geometry which allows them to fit into each other. Thus, the fixing operation gets easier and both parts cannot be pulled apart once put together (an industrial adhesive can still be used).

It will be understood that the above described embodiments are for purposes of illustration only and that changes and modifications may be made thereto without departing from the spirit and scope of the invention.

What is claimed is:

1. An adaptor for mounting a baby chair on a bicycle, said adaptor comprising:

a substantially elongated supporting structure, said supporting structure defining a longitudinal axis, a supporting structure first end, a supporting structure second end;

said supporting structure defining a bending channel extending transversely relative to said longitudinal axis, said bending channel defining a supporting structure bending segment, said bending channel also defining a first spacing segment extending from said supporting structure first end to said bending segment, said bending channel further defining a second spacing segment extending from said supporting structure second end to said bending segment, said bending channel being configured and sized so as to allow a relative bending movement between said first and second spacing segments about said bending segment;

a cushioning means for cushioning said bending movement about said bending segment, said cushioning means being retained within said bending channel;

a first fixing means for fixing said supporting structure to said bicycle, said first fixing means being positioned adjacent said supporting structure first end;

a second fixing means for fixing said baby chair to said supporting structure, said second fixing means being positioned adjacent said supporting structure second end.

2. An adaptor as recited in claim 1 wherein said supporting structure includes an arm extending integrally from said supporting structure first end to said supporting structure second end and said bending channel extends transversely through said arm.

3. An adaptor as recited in claim 2 wherein said arm is made of an arm material, said cushioning means is made of a cushioning material, said cushioning material being more compressible than said arm material.

4. An adaptor as recited in claim 3 wherein said cushioning material is an elastomeric material.

5. An adaptor as recited in claim 1 wherein said cushioning means has a cushioning means exterior surface, said cushioning means exterior surface being configured so as to cooperate with said bending channel for retaining said cushioning means within said bending channel.

6. An adaptor as recited in claim 5 wherein said cushioning means includes an internal cavity formed therein.

7. An adaptor as recited in claim 6 wherein said internal cavity is at least partially filled with a gas and said cushioning means further includes:

a channel extending between said cushioning means exterior surface and said internal cavity;

a valve in fluid communication with said channel for selectively allowing free passage of said gas through said channel.

8. An adaptor as recited in claim 1 wherein said first fixing means includes:
a pair of jaw members, said jaw members being pivotable between a jaw first position wherein said jaw members allow insertion of a bicycle component therebetween and a jaw second position wherein said jaw members frictionally engage said bicycle component;
a jaw locking means for selectively locking said jaw members in said jaw second position.

9. An adaptor as recited in claim 8 wherein said jaw members define a post receiving channel therebetween; said post receiving channel being configured and sized so as to frictionally engage the outer surface of a seat post part of said bicycle when said jaw members are in said jaw second position.

10. An adapter as recited in claim 9 wherein said post receiving channel is provided with a reinforcing sleeve, said reinforcing sleeve being made of a generally rugged material, said reinforcing sleeve defining a generally anti-skid sleeve inner surface.

11. An adaptor as recited in claim 11 further comprising a length adjustment means for customizing a distance between said first fixing means and said second fixing means.

12. A supporting structure as recited in claim 11 wherein said length adjustment means includes an adjustment rod telescopically mounted to said supporting structure adjacent said supporting structure second end and a locking means for releasably locking said rod in a predetermined telescopic relationship relative to said supporting structure.

13. An adaptor as recited in claim 1 wherein said second fixing means includes a fixing plate mounted on said supporting structure adjacent said supporting structure second end, said fixing plate being provided with a set of fixing apertures extending therethrough whereby said fixing apertures are configured and sized for receiving fixing bolts of said baby chair.

14. An adaptor as recited in claim 1 further comprising a mounting means for releasably mounting a luggage rack on said supporting structure said mounting means being fixed to said supporting structure.

15. An adaptor as recited in claim 14 wherein said mounting means includes at least one mounting clip extending from said supporting structure, said mounting clip being configured and sized for fittingly receiving a section of said luggage rack.

16. An adaptor as recited in claim 1 further comprising light reflection means for reflecting light shined thereon, said light reflection means being mounted on said supporting structure.

17. An adaptor as recited in claim 1 wherein said supporting structure includes a channel forming component, said channel forming component defining a generally concave section;
a proximal spacing segment attached to said channel forming component, said proximal spacing segment extending from said channel forming component to said supporting structure first end;
a distal spacing segment attached to said channel forming component, said distal spacing segment extending from said channel forming component to said supporting structure second end.

18. An adaptor as recited in claim 17 wherein said channel forming component includes a strip made of a relatively resilient material, said strip being bended so as to define a generally U-shaped cross-sectional configuration.

19. A cushioning chair base for mounting a baby chair on a bicycle, said cushioning chair base comprising:
a substantially elongated main arm, said main arm defining a longitudinal axis, a main arm first end, a main arm second end;

said main arm defining a bending canal, said bending canal extending transversely relative to said longitudinal axis, said bending canal defining a bending segment, said bending canal also defining a first spacing segment extending from said main arm first end to said bending canal, said bending canal further defining a second spacing segment extending from said main arm second end to said bending canal, said bending segment being configured and sized so as to form a spring component allowing a relative bending movement between said first spacing segment and said second spacing segment about said bending canal;

a compressible device, said compressible device being configured and sized so as to fit into said bending canal, said compressible device being used as a shock absorber;
a first fixing device for fixing said main arm to said bicycle, said first fixing device being positioned adjacent said main arm first end;
a second fixing device including a sliding arm and a fixing plate for fixing said baby chair to said main arm through said second fixing device, said second fixing device being positioned adjacent said main arm second end;
an angular adjusting device for adjusting tilt of said main arm once installed on said bicycle.

* * * * *